United States Patent
Thor

(10) Patent No.: US 8,965,649 B1
(45) Date of Patent: Feb. 24, 2015

(54) TRANSMISSION WITH POWER DOWNSHIFT ANTICIPATION LOGIC

(71) Applicant: GM Global Technology Operations LLC, Detroit, MI (US)

(72) Inventor: Todd Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 13/962,433

(22) Filed: Aug. 8, 2013

(51) Int. Cl.
  *G06F 7/00* (2006.01)
  *B60W 10/11* (2012.01)
  *B60W 10/02* (2006.01)

(52) U.S. Cl.
  CPC ............... *B60W 10/11* (2013.01); *B60W 10/02* (2013.01)
  USPC ............. 701/67; 477/115; 477/144; 477/172; 477/180; 192/3.57; 192/3.58

(58) Field of Classification Search
  CPC .............. B60W 10/02; B60W 10/023; B60W 2510/02; B60W 2510/0208; B60W 2510/0216; B60W 2510/0241; B60W 2710/02; B60W 2710/021; B60W 2710/025
  See application file for complete search history.

(56) References Cited

U.S. PATENT DOCUMENTS

| | | | |
|---|---|---|---|
| 4,527,678 A * | 7/1985 | Pierce et al. .................. | 192/3.58 |
| 4,790,418 A * | 12/1988 | Brown et al. ................... | 701/51 |
| 6,385,520 B1 * | 5/2002 | Jain et al. ......................... | 701/51 |
| 6,994,647 B2 * | 2/2006 | Cicala et al. .................. | 475/121 |
| 8,510,005 B1 * | 8/2013 | Monajemi et al. .............. | 701/67 |
| 8,565,990 B2 * | 10/2013 | Ortmann et al. ................ | 701/67 |
| 8,744,705 B2 * | 6/2014 | Thor ............................... | 701/55 |

* cited by examiner

*Primary Examiner* — David D Le
(74) *Attorney, Agent, or Firm* — Quinn Law Group, PLLC

(57) ABSTRACT

A vehicle includes an internal combustion engine, an engine control module (ECM) programmed to estimate engine torque as a function of throttle request, and a transmission assembly. The transmission assembly includes a plurality of gear sets and clutches, including an offgoing clutch and an oncoming clutch for a power downshift, and a transmission control module (TCM). The TCM includes a processor and memory on which is recorded a shift line for the downshift, and instructions for executing the downshift. The TCM communicates an estimated throttle level at the shift line to the ECM, receives an estimated engine torque for the estimated throttle level at the shift line from the ECM, and decreases offgoing pressure to the offgoing clutch to a threshold pressure level prior to executing the downshift. The TCM then decreases the offgoing clutch pressure to a calibrated pressure at the shift line to execute the downshift.

16 Claims, 3 Drawing Sheets

US 8,965,649 B1

TRANSMISSION WITH POWER DOWNSHIFT ANTICIPATION LOGIC

TECHNICAL FIELD

This disclosure relates to an automatic transmission having power downshift anticipation logic.

BACKGROUND

In an automatic vehicle transmission, a set of hydraulic clutches is selectively engaged to couple transmission input and output members in a desired speed ratio. A clutch-to-clutch shift occurs in such a transmission via the coordinated release of a clutch associated with the current speed ratio, i.e., the offgoing clutch, with engagement of another clutch associated with a desired new speed ratio, i.e., the oncoming clutch. A clutch-to-clutch shift from a higher speed ratio to a lower speed ratio made in conjunction with an increased throttle request is referred to as power downshift.

SUMMARY

A transmission assembly is disclosed herein having an oncoming clutch, an offgoing clutch, one or more gear sets, and a transmission control module (TCM). The TCM, which is in communication with an engine control module (ECM), is programmed, equipped, or otherwise configured to control a clutch-to-clutch power downshift in the anticipatory manner disclosed herein so as to improve the overall response time and shift quality.

In particular, a vehicle includes an internal combustion engine, an engine control module (ECM) in communication with the engine that is programmed to estimate engine torque as a function of throttle request, and a transmission assembly. The transmission assembly includes a plurality of gear sets, a plurality of clutches, and a transmission control module (TCM). One of the clutches is an offgoing clutch and another is an oncoming clutch for a clutch-to-clutch power downshift.

The TCM includes a processor and tangible, non-transitory computer-readable memory on which is recorded a shift line for the power downshift and instructions for anticipating the power downshift. The TCM communicates an estimated throttle level at the shift line to the ECM in response to a threshold increased throttle event, receives an estimated engine torque for the estimated throttle level at the shift line from the ECM, decreases an offgoing pressure command to the offgoing clutch to a threshold pressure level prior executing the power downshift, and then decreases the offgoing clutch pressure to a calibrated pressure at the shift line to thereby execute the power downshift, either as a step or as a ramp.

A method includes communicating, via the TCM, an estimated throttle level at a shift line to the ECM in response to a threshold increased throttle level, and receiving, via the TCM, an estimated engine torque for the estimated throttle level at the shift line from the ECM. The method also includes decreasing offgoing pressure command to the offgoing clutch to a threshold pressure level prior executing the power downshift, and then decreasing the offgoing clutch pressure to a calibrated pressure at the shift line to thereby execute the power downshift.

The above features and the advantages of the present disclosure are readily apparent from the following detailed description of the best modes for carrying out the invention when taken in connection with the accompanying drawings.

DETAILED DESCRIPTION

Figure 1:
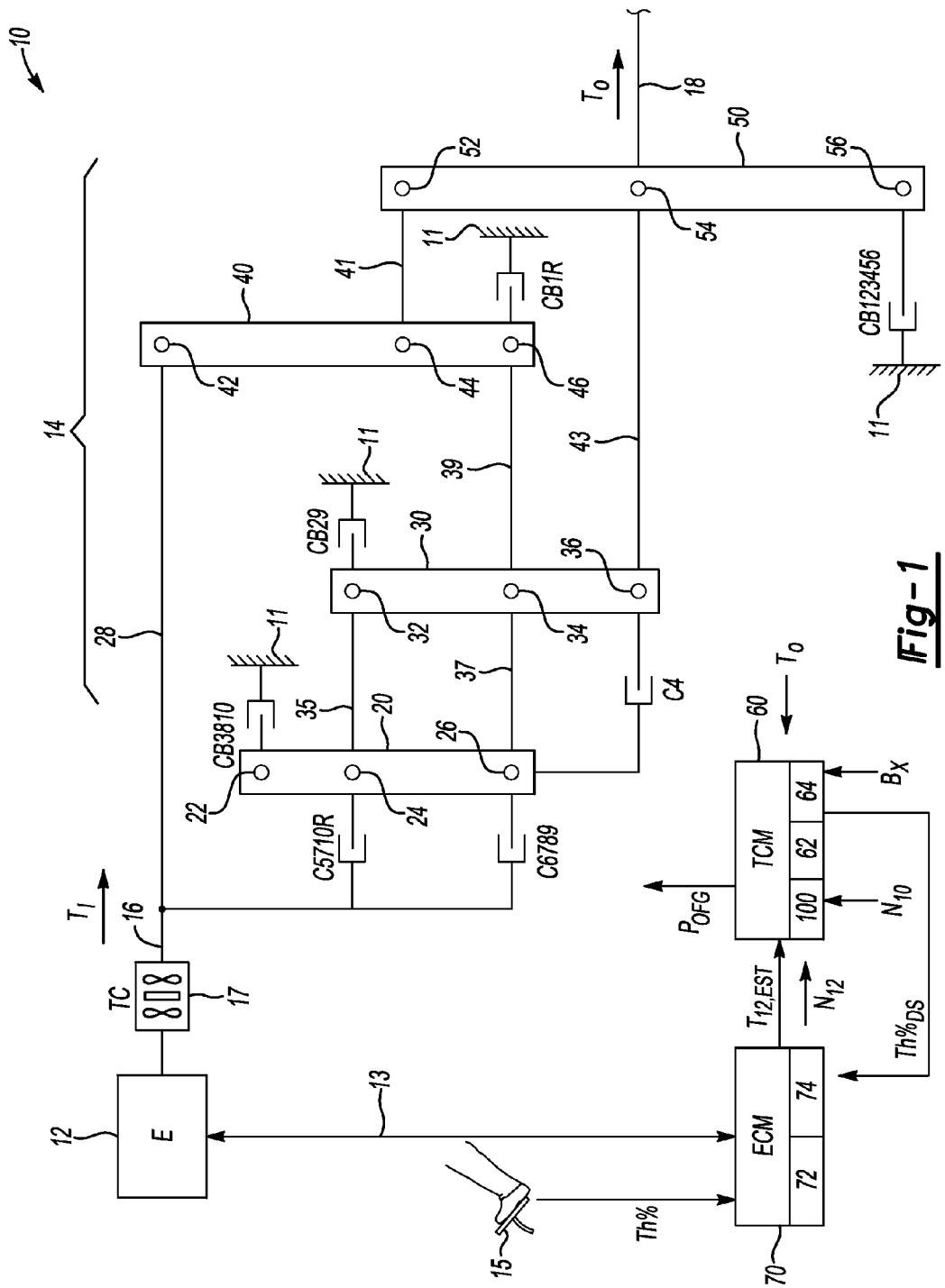
FIG. 1 is a schematic illustration of an example vehicle having a multi-speed automatic transmission assembly, including a set of hydraulic clutches and a controller which anticipates a power downshift maneuver as set forth herein.

An example vehicle 10 is shown schematically in FIG. 1. The vehicle 10 includes an internal combustion engine (E) 12 and a multi-speed automatic transmission assembly 14. The vehicle 10 includes a controller, hereinafter referred to as a transmission control module (TCM) 60, which controls all shift operations of the vehicle 10. The TCM 60 is in communication with an engine control module (ECM) 70, which communicates with the engine 12 via engine control signals (double headed arrow 13). The TCM 60 is programmed, equipped, or otherwise configured to control a clutch-to-clutch power downshift in an anticipatory manner to thereby improve the overall response time and shift quality, as will be described below with reference to FIGS. 2 and 3.

The transmission assembly 14 of FIG. 1 is shown in a non-limiting example embodiment in schematic lever diagram form, as will be understood by those having ordinary skill in the art. The transmission assembly 14 includes an input member 16 and an output member 18. The respective input and output members 16 and 18 are selectively connected to each other at a desired speed ratio via a plurality of gear sets. In the example 10-speed embodiment of FIG. 1, the transmission assembly 14 has four planetary gear sets, i.e., a first gear set 20, a second gear set 30, a third gear set 40, and a fourth gear set 50. Fewer or more speeds or gear sets may be envisioned without departing from the intended inventive scope, for instance a 6-speed or 8-speed transmission assembly.

Input torque (arrow $T_I$) from the engine 12 is transferred to the transmission assembly 14 via a hydrodynamic torque converter (TC) 17. As is well known in the art, such torque converters include a drive member or turbine that is directly connected to the engine 12, a stationary member or stator, and a driven member/impeller that is connected to the input member 16. The torque converter 17 fluidly couples the engine 12 to the transmission assembly 14, with output torque (arrow $T_O$) from the transmission assembly 14 ultimately transferred to the output member 18, and from there to the drive wheels (not shown).

The TCM 60 is configured to control the application and release of various clutches of the transmission assembly 14 during a given shift maneuver. As is well known in the art, such controllers may include a processor 62 and tangible, non-transitory, computer-readable memory 64. Like the TCM 60, the ECM 70 is also a computer device having a processor 72 and tangible, non-transitory, computer-readable memory 74. For instance, memory 64 and 74 may be embodied as magnetic media/ROM, optical media, flash memory, etc. The TCM 60 and ECM 70 may also include any required transitory memory such as RAM and EEPROM, as well as any required timers, input/output (I/O), and the like.

Structurally, the TCM 60 may be embodied as a computer device(s) configured, i.e., programmed in software and sufficiently equipped in hardware, to automatically select between various available transmission modes using such variables as percentage throttle request (Th %) from an accelerator pedal 15, vehicle speed ($N_{10}$), braking levels ($B_X$), engine speed ($N_{12}$), and transmission output speed ($T_O$). In addition to these customary shift control functions, the TCM 60 of FIG. 1 is also configured to execute an anticipatory downshift control method 100, via offgoing clutch pressure commands ($P_{OFG}$), with steps of the method 100 described below with specific reference to FIG. 3.

In a conventional power downshift, a driver depresses the accelerator pedal 15 and thereby requests a certain amount of vehicle acceleration, with the apply force to and/or travel of the accelerator pedal 15 ultimately determining the level of throttle request (% Th). The TCM 60 of FIG. 1 is aware of the location of a "shift line" for each possible downshift maneuver, for instance by accessing a stored lookup table that is indexed by throttle request (% Th) and vehicle speed ($N_{10}$). As is known in the art, at the shift line, logic of the TCM 60 automatically commands execution the various steps needed for controlling the shift maneuver. However, it is recognized herein that conventional shift control approaches may result in shifts, particularly power downshifts, having a less than optimal shift quality or feel. This is due largely to the effects of hysteresis in the fluid circuit controlling the clutches of the transmission 14, with actual clutch pressure lagging a stepped clutch pressure command.

The method 100 of the present invention instead allows the TCM 60 to look forward in time via specific signals made available to the TCM 60 by the ECM 70, including an estimated engine torque (arrow $T_{12, EST}$). The TCM 60 transmits the downshift throttle request (Th %$_{DS}$) information to the ECM 70 continuously or at a set frequency.

With respect to the example transmission assembly 14 shown in FIG. 1, the first gear set 20 of FIG. 1 may include first, second, and third nodes 22, 24, and 26, respectively. The second, third, and fourth gear sets 30, 40, and 50 may likewise have respective first, second, and third nodes. For the second gear set 30, the first, second, and third nodes are nodes 32, 34, and 36, respectively, while in the third gear set 40, these are respective nodes 42, 44, and 46. The fourth gear set 50 has respective first, second, and third nodes 52, 54, and 56.

Any two clutches of the transmission assembly 14 could be designated as oncoming and offgoing clutches within the scope of the present invention. The particular clutches serving these functions would depend on the construction of the transmission assembly 14 and the shift maneuver being commanded, as would be appreciated by those having ordinary skill in the art. Therefore, while the 10-speed embodiment of FIG. 1 is described herein for illustrative consistency, the method 100 may be applied to any multi-speed transmission having at least two clutches serving as respective oncoming and offgoing clutches.

The first node 22 of the first gear set 20 is selectively connected to a stationary member 11 via a braking clutch CB3810. The second node 24 is selectively connected to the engine 12 via a rotating clutch C5710R. Likewise, the third node 36 is selectively connected to the engine 12 via a rotating clutch C6789. As used hereinafter for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $10^{th}$ gear. The absence of a "B" in the clutch designation indicates that the particular clutch is a rotating clutch.

With respect to the second gear set 30, the first node 32 is continuously connected to the second node 24 of the first gear set 20 via a first interconnecting member 35. The first node 32 is also selectively connected to the stationary member 11 via a braking clutch CB29. The second gear set 30 is also continuously connected to the first gear set 20 via a second interconnecting member 37. The second interconnecting member 37 connects the second node 34 of the second gear set 30 to the third node 26 of the first gear set 20. A rotating clutch C4 selectively connects the respective third nodes 26 and 36 of the first and second gear sets 20 and 30. Another braking clutch CB1R selectively connects the third node 46 of the third gear set 40 to the stationary member 11.

Still referring to FIG. 1, a third interconnecting member 28 continuously connects the input member 16 to the first node 42 of the third gear set 40. Likewise, a fourth interconnecting member 41 connects the second node 44 of the third gear set 40 the first node 52 of the fourth gear set 50. A fifth interconnecting member 43 connects the third node 36 of the second gear set 30 to the second node 54 of the fourth gear set 50. A sixth interconnecting member 39 connects the second node 34 of the second gear set 30 to the third node 46 of the fourth gear set 50. The third node 56 of the fourth gear set 50 is selectively connected to the stationary member 11 via a braking clutch CB123456, with the output member 18 of the transmission being continuously connected to the second node 54 of the same gear set. Thus, the second node 54 of the fourth gear set 50 delivers the output torque (arrow $T_O$) needed for powering the vehicle 10.

In an example embodiment, the first nodes 22, 32, 42, second nodes 24, 34, 44, and third nodes 26, 36, 46 of each of the first, second, and third gear sets 20, 30, and 40 may be a sun gear, a carrier, and a ring gear, respectively. In such an embodiment, the first, second, and third nodes 52, 54, 56 of the fourth gear set 50 may be a respective ring gear, carrier, and sun gear.

As noted above, the configuration shown for the transmission 14 in FIG. 1 is merely illustrative, and other configurations may be used without departing from the intended inventive scope, e.g., 6-speed or 8-speed transmissions having any number of gear sets. The control method 100 that will now be discussed with reference to FIGS. 2 and 3 may be used within any of these transmissions, with the caveat that the transmission assembly 14 must be a multi-speed automatic transmission capable of executing a clutch-to-clutch power downshift. In such a clutch-to-clutch shift, torque is offloaded from the offgoing clutch to the oncoming clutch, with an inertia phase in the early part of the shift maneuver followed by a torque phase.

Figure 2:
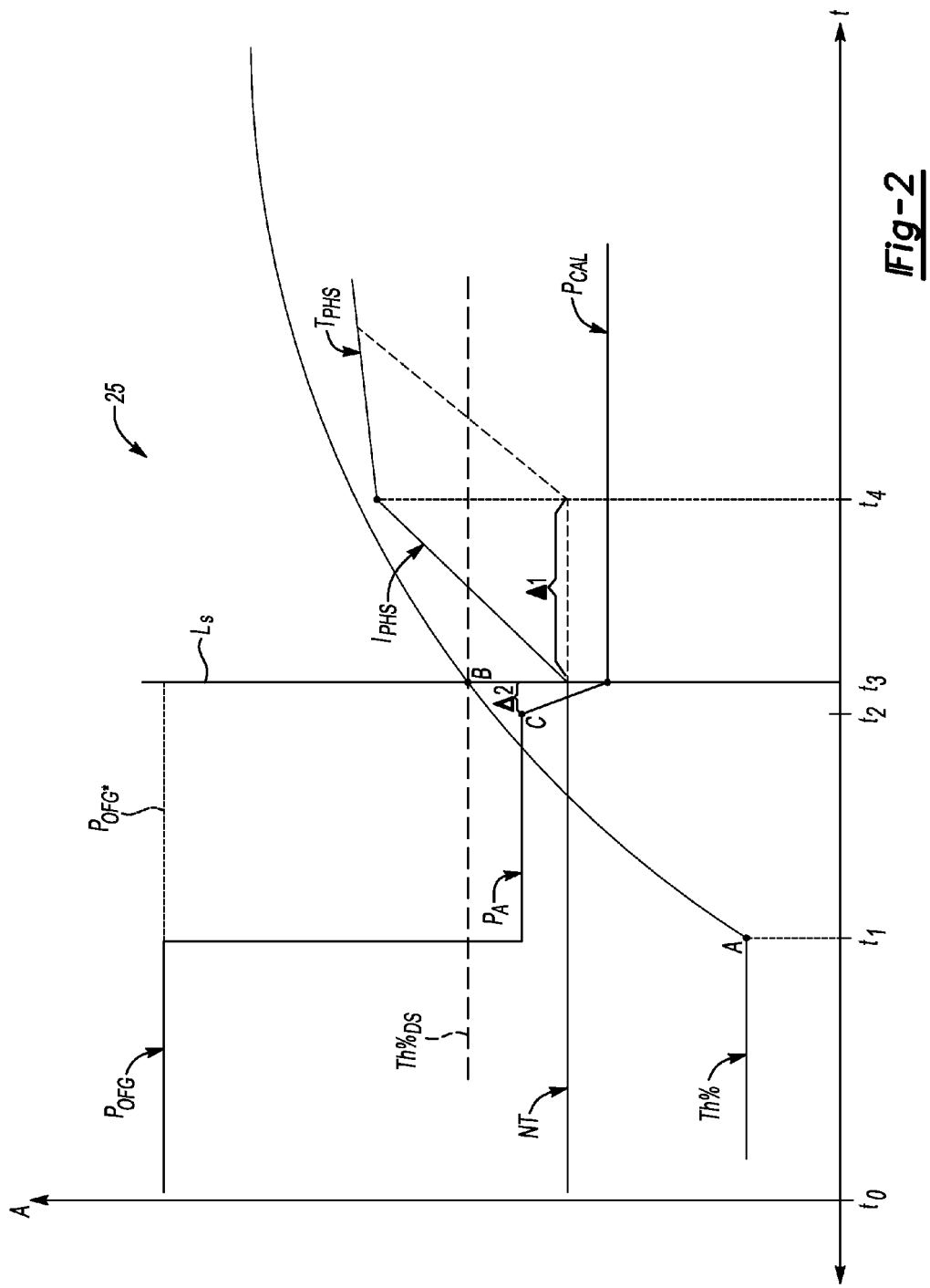
FIG. 2 is an example set of vehicle control traces illustrating the anticipatory control method disclosed herein, with time plotted on the horizontal axis and amplitude plotted on the vertical axis.

Referring to FIG. 2, a set of example vehicle traces 25 may be used to illustrate the present anticipatory power downshift control approach. Time (t) is plotted on the horizontal axis, while signal amplitude (A) is plotted on the vertical axis. All control decisions occur within logic of the TCM 60 of FIG. 1. At time $t_0$, offgoing clutch pressure is at a calibrated level and turbine speed ($N_T$) is level, with turbine speed ($N_T$) for all practical purposes being the same as the engine speed ($N_{12}$ of FIG. 1). At point A coinciding with time $t_1$, a driver of the vehicle 10 of FIG. 1 depresses the accelerator pedal 15 shown in the same Figure. The result of this action is an increasing level of throttle request (Th %) received by the ECM 70 commencing at $t_1$. Note that turbine speed ($N_T$) does not immediately change, as the throttle request (Th %) is not immediately translated into an engine speed command.

In the example of FIG. 2, the shift line noted above is represented by line $L_s$, which occurs at time $t_3$. As is well known in the art, a shift maneuver may be closely controlled in logic via programming of the TCM 60 of FIG. 1 using such shift lines, e.g., recorded in a lookup table indexed by throttle request (Th %) and vehicle speed ($N_{10}$). In other words, for a given vehicle speed, the TCM 60 of FIG. 1 knows where throttle request (Th %) should be at the onset of the power downshift, such as at 30% or 50% of a maximum possible throttle level. This information is referred to herein as the downshift throttle request (Th %$_{DS}$ of FIG. 1), i.e., the throttle request (Th %) occurring at point B, and it may be readily determined by reference to such a lookup table.

Typically, i.e., absent the present approach, the offgoing clutch pressure command (trace $P_{OFG}$) is stepped all the way down to the level of a calibrated control pressure ($P_{CAL}$) at the shift line ($L_S$), or in this example, at $t_3$. This conventional trace is shown as trace $P_{OFG}$* in FIG. 2. Because of this, a discrete time lag ($\Delta 1$) exists between $t_3$ and a later time, $t_4$, with $t_4$ representing the onset of the torque phase ($T_{PHS}$) of the power downshift. This may be as long as 100-200 ms in some transmissions. In lower-speed transmissions having relatively long inertial phases ($I_{PHS}$), for instance 300% to 400% of the length of the time lag ($\Delta 1$), this delay might not be noticeable to a driver. However, in emerging high-speed transmissions, such as the 10-speed example transmission assembly 14 of FIG. 1, the inertial phase may be of a similar length or longer than the length of the hysteresis-induced time lag ($\Delta 1$). As a result, a perceptible hesitation may exist as a driver waits for the inertial phase to finish.

To address this control problem, the TCM 60 of FIG. 1 instead communicates with the ECM 70 as shown in FIG. 1, for instance over a controller area network (CAN) bus, to determine the estimated engine torque ($T_{12, EST}$) that will be present when the power downshift is eventually initiated at the shift line (line $L_S$). Such an estimate may be provided via lookup table, modeling, or calculation, as is known in the art, e.g., with the relationship between throttle request (Th %), vehicle speed ($N_{10}$), braking levels ($B_X$), transmission output speed ($T_O$), and estimated engine torque ($T_{12, EST}$) captured a priori in memory 74 of the ECM 70.

The TCM 60 may transmit the downshift throttle request (Th %$_{DS}$) information to the ECM 70 at a set frequency, e.g., continuously or once per control loop. The ECM 70 of FIG. 1 receives this information and replies with an estimated engine torque ($T_{12, EST}$) for the provided level of downshift throttle request (Th %$_{DS}$). From this information, the TCM 60 can calculate or otherwise determine the critical holding pressure of the holding clutches, i.e., the hydraulic pressure at which the oncoming and offgoing clutches just begin to slip with respect to each other. For design purposes, such a level may be approximately 1 to 2 RPM, or any other measurable or calculable value slightly higher than 0 RPM.

The TCM 60 then adds a calibrated tolerance or margin to this critical pressure, for example +5% to +10%, and drops the offgoing clutch command ($P_{OFG}$) to the level of this calculated anticipatory pressure ($P_A$) ahead of the impending power downshift. This occurs at $t_1$ in FIG. 2. In actuality, this event would occur slightly later, i.e., by one or two control loops due to the slight communications delay. The anticipatory pressure ($P_A$), wherein $P_A$=Critical Pressure+Calibrated Margin, is held until reaching the shift line ($L_S$), at which time the offgoing clutch pressure is dropped to the calibrated clutch pressure ($P_{CAL}$).

To further optimize feel, the anticipatory pressure ($P_A$) may be optionally ramped down beginning at point C, or time $t_2$, to the calibrated clutch pressure ($P_{CAL}$) starting at a calibrated time period ($\Delta 2$) before reaching the shift line ($L_S$). In a possible embodiment, the calibrated time period ($\Delta 2$) may be in the range of 100 ms to 75 ms. Shorter or longer variants may be used without departing from the intended invention scope, including no delay at all, with shift feel varying with the design of the transmission 14, the downshift maneuver, and the particular calibrated time period ($\Delta 2$) that is selected. Once oncoming clutch pressure $P_{CAL}$ needed for completing the downshift is commanded by the TCM 60 of FIG. 1, the inertia phase ($I_{PHS}$) of the shift commences at $t_3$, and continues until $t_4$, at which point the torque phase ($T_{PHS}$) ensues.

Figure 3:
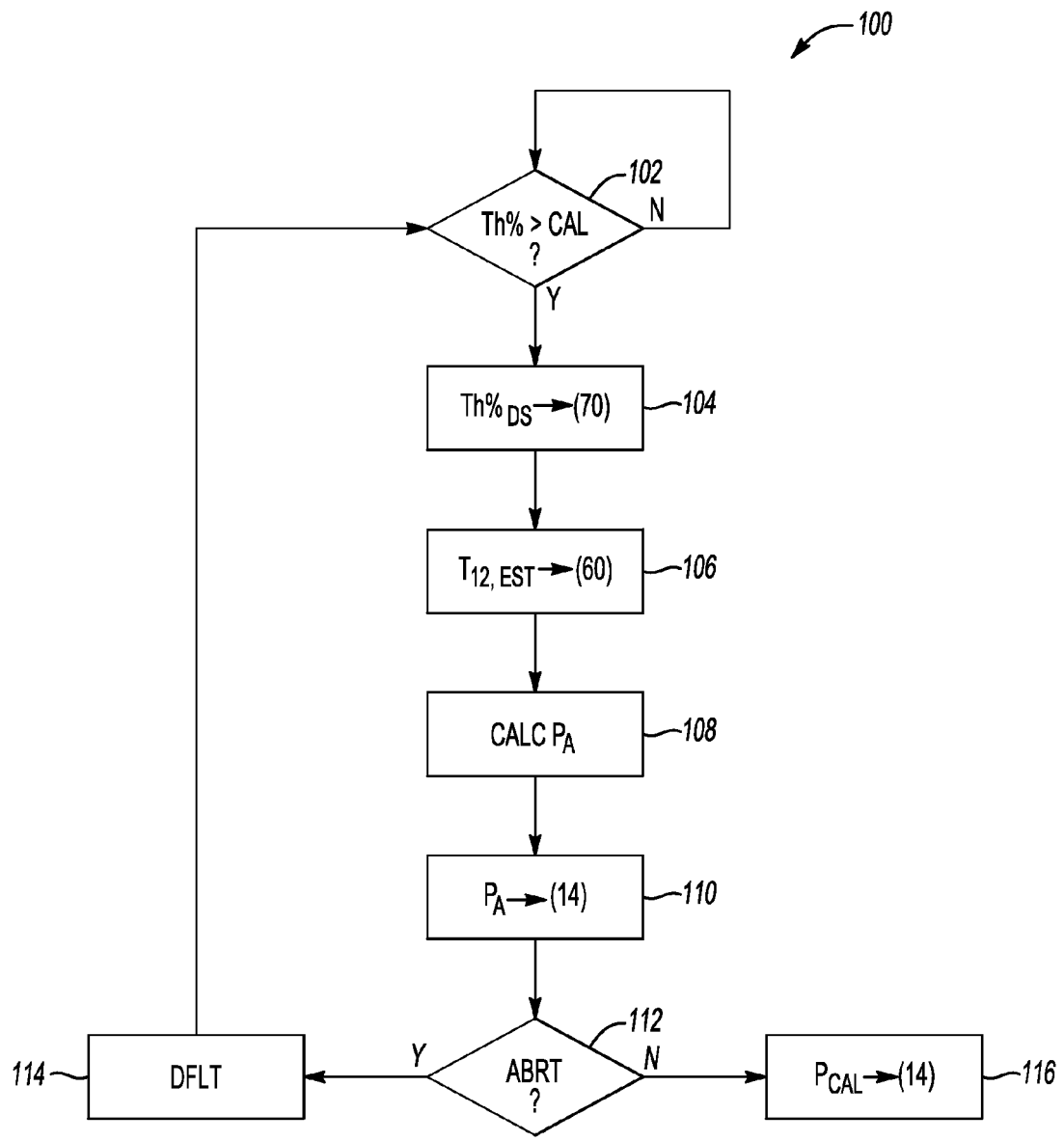
FIG. 3 is a flow chart describing an example method for anticipating a power downshift in an automatic transmission such as the example transmission of FIG. 1.

Referring to FIG. 3, a method 100 for anticipating a power downshift begins with step 102, wherein the ECM 70 of FIG. 1 receives a throttle request (Th %). This value is made known to the TCM 60, e.g., over a CAN bus. The TCM 60 then determines whether a threshold amount of throttle request (Th %) is present indicating a high likelihood of an impending power downshift. In response to a threshold increased throttle event, the method 100 proceeds to step 104. Step 102 is otherwise repeated.

At step 104, the TCM 60 shown in FIG. 1 transmits the corresponding downshift throttle percentage (Th %$_{DS}$) for initiating the impending downshift to the ECM 70. As noted above, such a value corresponds to point B in FIG. 2, and may be stored as a calibration value in memory 64 of the TCM 60, such as in a lookup table. The method 100 proceeds to step 106 once this step is completed.

Step 106 entails calculating or extracting, via the ECM 70, the estimated engine torque ($T_{12, EST}$) at the corresponding downshift throttle percentage (Th %$_{DS}$) from step 104. This value is transmitted back to the TCM 60 across the CAN bus. The method 100 then proceeds to step 108.

At step 108, the TCM 60 calculates the anticipatory pressure ($P_A$) shown in FIG. 2 as a function of the estimated engine torque ($T_{12, EST}$). This step may be via a calibrated equation. As noted above, the anticipatory pressure ($P_A$) is a pressure value that is slightly above the critical pressure at which the oncoming and offgoing clutches just begin to slip, e.g., when the relative slip is no more than about 1-2 RPM. A calibrated factor of 5 to 10% above this critical pressure, with the critical pressure determined as function of the input torque, may be sufficient in a possible embodiment. Once calculated, the method 100 proceeds to step 110.

Step 110 entails commanding the anticipatory pressure ($P_A$) from the offgoing clutch of transmission assembly 14 to be used in the impending power downshift. In FIG. 2, this occurs at $t_1$. This command drops the offgoing clutch pressure ($P_{OFG}$) to just above its critical pressure, which effectively stages the offgoing clutch in anticipation of the power downshift. This staging effectively eliminates the delay ($\Delta 1$) in FIG. 2. The method 100 then proceeds to step 112.

At step 112, the TCM 60 determines if calibrated abort (ABRT) criteria are present that would indicate that a driver no longer wishes to execute the expected power downshift. For instance, the driver may reduce the throttle request (Th %). If the abort criteria are satisfied, the method 100 proceeds to step 114. Otherwise, the method 100 proceeds to step 116.

Step 114 entails executing a default action, such as maintaining offgoing clutch pressure at the level of the anticipatory pressure ($P_A$), or sending the offgoing clutch pressure to a higher level. The method 100 may then repeat step 102.

Therefore, by using the method 100 described above in an overall multi-speed transmission control scheme, particularly during a power downshift, the TCM 60 of FIG. 1 can decrease clutch pressure to a designated offgoing clutch as soon as a threshold throttle request is detected. Clutch pressure drops to within an allowed calibrated margin of a critical holding pressure. Thereafter, when the throttle request passes a "point of no return" wherein exit from the impending downshift is not permitted, the TCM 60 can drop clutch pressure to its calibrated pressure for entering the inertia phase of the shift, either immediately upon reaching the shift line or shortly before then using a calibrated ramp down rate. In this manner, the TCM 60 may improve the overall shift feel of a power downshift.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
    an internal combustion engine responsive to a throttle request;
    an engine control module (ECM) in communication with the engine, and programmed to estimate an engine torque value as a function of the throttle request; and
    a transmission assembly that is connected to the engine, including:
        a plurality of gear sets;
        a plurality of clutches which selectively connect and disconnect different members of the plurality of gear sets to establish a desired gear ratio, wherein one of the clutches is an offgoing clutch and another of the clutches is an oncoming clutch for a power downshift; and
        a transmission control module (TCM) having a processor and tangible, non-transitory computer-readable memory on which is recorded a shift line for the power downshift and instructions for anticipating the power downshift, wherein the shift line defines a corresponding throttle level needed for initiating the power downshift;
    wherein the TCM is operable to communicate the corresponding throttle level to the ECM in response to a threshold increased throttle event, receive an estimated engine torque at the shift line from the ECM, decrease an offgoing pressure command to the offgoing clutch to a threshold pressure level prior executing the power downshift, and then decrease the offgoing clutch pressure to a calibrated clutch pressure at the shift line to thereby execute the power downshift.

2. The vehicle of claim 1, wherein the TCM is configured to determining a critical holding pressure of the offgoing and oncoming clutches, and to set the threshold pressure level within a calibrated margin of the critical holding pressure.

3. The vehicle of claim 2, wherein the calibrated margin is at least 5% of the critical holding pressure.

4. The vehicle of claim 3, wherein the calibrated margin is less than about 10% of the critical holding pressure.

5. The vehicle of claim 1, wherein the TCM is configured to initiate a ramp down of the offgoing clutch pressure down to the calibrated pressure starting a calibrated time period prior to the shift line.

6. The vehicle of claim 5, wherein the calibrated time period is between approximately 75 ms and 100 ms prior to the shift line.

7. A transmission assembly for a vehicle having an internal combustion engine and an engine control module (ECM) in communication with the engine, the transmission assembly comprising:
    a plurality of gear sets;
    a plurality of clutches which selectively connect and disconnect different members of the plurality of gear sets to establish a desired gear ratio, wherein one of the clutches is an offgoing clutch and another of the clutches is an oncoming clutch for a power downshift; and
    a transmission control module (TCM) having a processor and tangible, non-transitory computer-readable memory on which is recorded a shift line for the power downshift and instructions for anticipating the power downshift, wherein the shift line defines a corresponding throttle level needed for initiating the power downshift;
    wherein the TCM is operable to communicate the corresponding throttle level to the ECM in response to a threshold increased throttle event, receive an estimated engine torque at the shift line from the ECM, decrease an offgoing pressure command to the offgoing clutch to a threshold pressure level prior executing the power downshift, and then decrease the offgoing clutch pressure to a calibrated clutch pressure at the shift line to thereby execute the power downshift.

8. The transmission assembly of claim 7, wherein the TCM is configured to determining a critical holding pressure of the offgoing and oncoming clutches, and to set the threshold pressure level within a calibrated margin of the critical holding pressure.

9. The transmission assembly of claim 8, wherein the calibrated margin is at least 5% higher than the critical holding pressure.

10. The transmission assembly of claim 9, wherein the calibrated margin is less than about 10% higher than the critical holding pressure.

11. The transmission assembly of claim 7, wherein the TCM is configured to initiate a ramp down of the offgoing clutch pressure down to the calibrated pressure commencing a calibrated time period prior to the shift line.

12. The transmission assembly of claim 11, wherein the calibrated time period is between approximately 75 ms and 100 ms prior to the shift line.

13. A method comprising:
    communicating, via a transmission control module (TCM) of a vehicle having an engine controlled via an engine control module (ECM), an estimated throttle level at a shift line to the ECM in response to a threshold increased throttle event, wherein the TCM includes memory having a recorded shift line for a clutch-to-clutch power downshift defining a corresponding throttle level needed for initiating the power downshift;
    receiving, via the TCM, an estimated engine torque for the corresponding throttle level from the ECM;
    decreasing an offgoing pressure command to the offgoing clutch to a threshold pressure level prior to executing the power downshift; and
    decreasing the offgoing clutch pressure to a calibrated pressure at the shift line to thereby execute the power downshift.

14. The method of claim 13, further comprising:
    determining a critical holding pressure of the offgoing and oncoming clutches; and
    setting the threshold pressure level to within a calibrated margin of the critical holding pressure.

15. The method of claim 14, wherein the calibrated margin is at least 5% higher and no more than 10% higher than the critical holding pressure.

16. The method of claim 13, wherein decreasing the offgoing clutch pressure to the calibrated pressure at the shift line further includes initiating a ramp down of the offgoing clutch pressure to the calibrated pressure commencing at least 75 ms prior to the shift line.

* * * * *